R. B. WILLIAMSON.
RETAINING WEDGE FOR DYNAMO ELECTRIC MACHINES.
APPLICATION FILED DEC. 1, 1916.

1,279,810.

Patented Sept. 24, 1918.

Inventor
R. B. Williamson
by
Attorney

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

RETAINING-WEDGE FOR DYNAMO-ELECTRIC MACHINES.

1,279,810.   Specification of Letters Patent.   Patented Sept. 24, 1918.

Application filed December 1, 1916. Serial No. 135,081.

*To all whom it may concern:*

Be it known that I, ROBERT B. WILLIAMSON, a citizen of the United States, residing at Milwaukee, in the county of Milwaukee and State of Wisconsin, have invented a certain new and useful Improvement in Retaining-Wedges for Dynamo-Electric Machines, of which the following is a specification.

This invention relates in general to dynamo-electric machinery, and has particular reference to devices for securing windings in core slots of such machinery.

In dynamo-electric machinery of the distributed winding type wherein the winding elements are disposed in core slots, it is often desirable that the slots be at least of the partially closed type. This provision is especially desirable in large size alternating current machines, especially in the armatures of turbo-generators, where the slots are necessarily wide on account of the large size of the conductors used and where it is desirable that the windings be separated a considerable distance from the rotor in order to keep down excessive current on short circuit, and generally where it is desirable that such windings have considerable reactance; and it is also desirable in this latter class of machines that the devices for retaining these windings in position in the slots be of such a character that eddy current losses are reduced to a minimum, and, likewise that they may be readily inserted into and removed from operative position with little danger of injury to the insulation of the winding elements in the slots.

It is an object of this invention to provide an improvement in the construction of dynamo-electric machines wherein the windings are disposed in slots, embodying an improved construction of a retaining wedge or device for securing the windings in position in the slots.

It is a further object of this invention to provide an improvement in the construction of dynamo-electric machines, embodying an improved retaining wedge of laminated magnetic material for securing the windings in slots of such machines.

These and other objects are attained by this invention, the various novel features of which will appear from the description and drawings, disclosing embodiments of such invention, and will be particularly pointed out in the claims.

Figure 1:
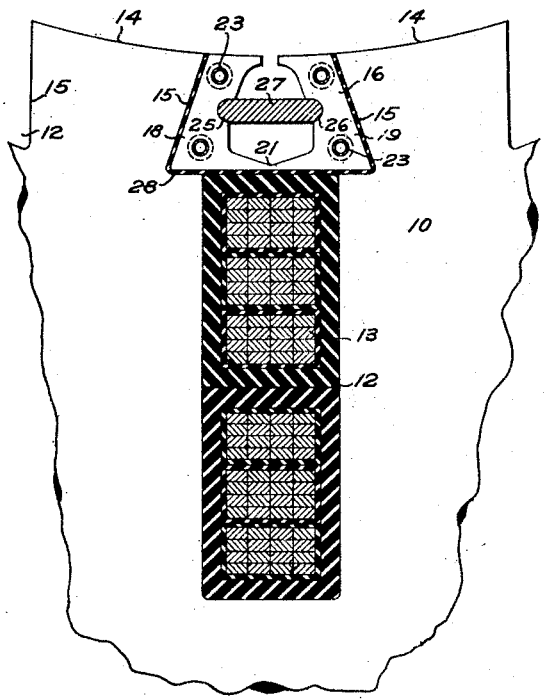
Figure 1 is a broken sectional view of a laminated core with the windings retained in slots therein by means of retaining wedges embodying features of this invention.
Figure 2:
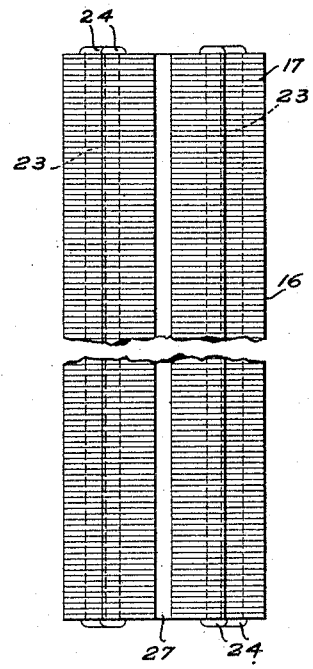
Fig. 2 is a plan view of the retaining wedge of Fig. 1.

As illustrated in Fig. 1, a core 10, which may be the stationary armature of a turbo-generator, is provided with slots 12 for the reception of an armature winding 13, in the form of two superposed layers of suitably insulated conductors. The teeth 14 formed between adjacent slots are recessed or undercut, as indicated at 15, to form retaining walls for wedges 16 which secure the windings in position in the slots.

These securing or retaining wedges 16 are made up of a plurality of laminations 17 of a cross-sectional shape such that, when disposed in planes parallel to the laminations of the core, these wedge laminations fit easily within the open portion of the slots, that is, the portion between the winding 13 and the air-gap. The laminations are recessed or hollowed at the center and are cut through at the air-gap side to remove the required amount of material to provide for the proper reactance of the windings in the slots, the recess or hollow dividing each lamination into two side portions 18, 19 which approach each other adjacent the air-gap side of the wedge, gradually tapering in cross-sectional area as they approach. At the lower side of the wedge, that is, the side opposite the air-gap side, the side pieces of the lamination are of decreasing cross-sectional area, the minimum cross-sectional area being at the middle of this lower side, as indicated at 21, and this area being such that the side pieces may be readily sprung or distorted about this middle point so as to force the side pieces of the assembled retaining wedge into intimate contact with the undercut sides of the adjacent teeth to secure and lock the wedge in position. The laminations are assembled on a plurality of rods 23 which are preferably riveted over at the ends, as indicated at 24, to secure and maintain the laminations in the form of a unitary and readily handled retaining wedge.

The inner sides of the side walls or portions 18, 19 of the wedge 16 are recessed or cut away at 25, 26 respectively, to provide seats for a spreading or locking wedge or key 27 which is adapted to be driven between these side walls to force the same laterally about the point 21 at the middle of the lower side as a pivot.

When the windings 13 are inserted in position in the slots 12, the open end of each slot adjacent the air-gap is preferably lined with insulating material 28 and the assembled retaining wedge 16 is slipped into position from the end of the core part 14, the wedge being of such size as to be readily insertible in the open end of the slot without any damage to the insulation or windings by the edges of the laminations of which the wedge is composed. The locking or spreading wedge or key 27 is then inserted with its spreading or wedge edges fitted in the recesses or seats 25, 26, in the side walls 18, 19, respectively, of the wedge and is forced or driven into position, the width of the body portion of this key being slightly greater than the distance between the seats 25, 26 when the side walls are in normal position, to spread the side walls and force the same into intimate contact with the undercut sides of the adjacent teeth 14, or the insulation 28, to firmly secure the retaining wedge in position.

The locking or spreading wedge or key 27 may be of metal, of magnetic or non-magnetic material, or may be of insulating material, as desired, but the portions thereof that engage with the edges of the laminations of the main wedge and the windings or insulation thereabout are preferably comparatively smooth and of fairly soft material so that the key can readily accommodate itself to roughness of the coacting surface of the retaining wedge.

It will be apparent that, in accordance with this invention, there is provided a desirable type of wedge of such a character as to contribute to the most efficient operation of the machine and such as may be readily inserted to operative position in the slots of the machine, and secured therein and readily removed therefrom with comparatively little or no danger of damage to the windings or insulation in the slots.

It should be understood that it is not desired that the invention, as claimed, be limited to the exact details of construction shown and described, for obvious modifications will occur to a person skilled in the art.

It is claimed and desired to secure by Letters Patent:

1. In a dynamo-electric machine, the combination with a magnetizable core provided with winding-containing slots, retaining wedges disposed in the open ends of said slots, each of said retaining wedges being made up of a plurality of laminations arranged transversely of the length of the slots and secured together, said laminations being hollowed or recessed and open at the air-gap side, the opposite side of said wedge being of decreased cross-section at the middle of said side, and a locking or spreading wedge or key seated in recesses in the side portions of the retaining wedge and operative to distort said side portions about the part of reduced cross-section and to force said side portions into operative position relative to the adjacent teeth.

2. A retaining wedge for securing a winding in the slots of a dynamo-electric machine comprising a plurality of laminations arranged transversely of the length of the wedge and secured together, the laminations of said wedge being interiorly recessed to provide spaced side walls separated at one end and recessed at their inner sides, said laminations being of decreased cross-section adjacent the middle of the side opposite the air-gap side, and a spreading or locking wedge or key adapted to seat in the recesses in said side walls and to distort said side walls about the point of reduced cross-section for the purpose of forcing said wedge to operative position.

3. In a dynamo-electric machine, in combination with a magnetic core provided with winding-containing slots, retaining wedges disposed in the open ends of said slots, each of said retaining wedges being made up of a plurality of laminations arranged transversely of the length of the slots and secured together, said laminations being hollowed or recessed and open at the air-gap side, the opposite side of said wedge being of decreased cross-section at the middle of said side, and a locking or spreading wedge or key seated in recesses in the side portions of the retaining wedge leaving an opening at the air-gap side and operative to distort said side portions about the part of reduced cross-section and to force said side portions into operative position relative to the adjacent teeth.

4. A retaining wedge for securing a winding in the slots of a dynamo-electric machine comprising a plurality of laminations arranged transversely of the length of the wedge and secured together, the laminations of said wedge being interiorly recessed to provide spaced side walls separated at one end and recessed at their inner sides, said laminations being of decreased cross-section adjacent the middle of the side opposite the air-gap, and a spreading or locking wedge or key adapted to seat in the recesses in said side walls leaving an opening at the air-gap side and to distort said side walls about the part of reduced cross-section for the purpose of forcing said wedge to operative position.

5. In a dynamo-electric machine, in combination with a magnetic core provided with air-gap, and a spreading or locking wedge or key adapted to seat in the recesses in said side walls of a width greater than the opening of the air-gap side of said laminations and to distort said side walls about the part of reduced cross-section for the purpose of forcing said wedge to operative position.

winding-containing slots, retaining wedges disposed in the open ends of said slots, each of said retaining wedges being made up of a plurality of laminations arranged transversely of the length of the slots and secured together, said laminations being hollowed or recessed and open at the air-gap side, the opposite side of said wedge being of decreased cross-section at the middle of said side, and a locking or spreading wedge or key seated in recesses in the side portions of the retaining wedge of a width greater than the opening at the air-gap side of said laminations and operative to distort said side portions about the point of reduced cross-section and to force said side portions into operative position relative to the adjacent teeth.

6. A retaining wedge for securing a winding in the slots of a dynamo-electric machine comprising a plurality of laminations arranged transversely of the length of the wedge and secured together, the laminations of said wedge being interiorly recessed to provide spaced side walls separated at one end and recessed at their inner sides, said laminations being of decreased cross-section adjacent the middle of the side opposite the air-gap, and a spreading or locking wedge or key adapted to seat in the recesses in said side walls of a width greater than the opening of the air-gap side of said laminations and to distort said side walls about the part of reduced cross-section for the purpose of forcing said wedge to operative position.

7. A retaining wedge for securing a winding in the slots of a dynamo-electric machine, said wedge being interiorly recessed to provide spaced side walls separated a substantially greater distance at their inner sides than at the air-gap side and having recesses at their inner sides and a spreading or locking wedge or key adapted to seat in the recesses in said side walls and to distort said side walls for the purpose of forcing said wedge to operative position.

8. A winding-retaining wedge of dove tail form for dynamo-electric machines, having a longitudinal recess open at the air gap side, said opening being of less width than the interior of said recess, and a wedge or key for forcing the walls of the dove tail wedge apart.

In testimony whereof, the signature of the inventor is affixed hereto.

ROBERT B. WILLIAMSON.

Copies of this patent may be obtained for five cents each, by addressing the "Commissioner of Patents, Washington, D. C."